(12) United States Patent
Lam

(10) Patent No.: US 9,742,703 B2
(45) Date of Patent: Aug. 22, 2017

(54) CELL PROCESSING METHOD AND APPARATUS

(71) Applicant: Huawei Technologies Co., Ltd., Shenzhen (CN)

(72) Inventor: Wan Lam, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 312 days.

(21) Appl. No.: 14/713,497

(22) Filed: May 15, 2015

(65) Prior Publication Data

US 2015/0334056 A1  Nov. 19, 2015

(30) Foreign Application Priority Data

May 16, 2014  (CN) .......................... 2014 1 0209901

(51) Int. Cl.
*H04L 12/935* (2013.01)
*H04L 12/933* (2013.01)
*H04L 12/931* (2013.01)
*H04L 12/70* (2013.01)

(52) U.S. Cl.
CPC .......... *H04L 49/3027* (2013.01); *H04L 49/15* (2013.01); *H04L 49/40* (2013.01); *H04L 2012/5674* (2013.01)

(58) Field of Classification Search
None
See application file for complete search history.

(56) References Cited

U.S. PATENT DOCUMENTS

| 2002/0118421 | A1 | 8/2002 | Xiong et al. |
| 2003/0133465 | A1* | 7/2003 | Alfano ................. H04J 3/0685 370/412 |
| 2012/0213076 | A1 | 8/2012 | Wan et al. |
| 2012/0236850 | A1 | 9/2012 | Lam et al. |
| 2015/0078193 | A1 | 3/2015 | Kwon et al. |
| 2016/0270074 | A1 | 9/2016 | Sakoda |

FOREIGN PATENT DOCUMENTS

| CN | 1360414 A | 7/2002 |
| CN | 1757201 A | 4/2006 |
| CN | 102111334 A | 6/2011 |

(Continued)

*Primary Examiner* — Kevin C Harper
*Assistant Examiner* — Derrick V Rose
(74) *Attorney, Agent, or Firm* — Leydig, Voit & Mayer, Ltd.

(57) ABSTRACT

A cell processing method and apparatus are provided. The method includes: obtaining, by a first sending end, a first timestamp compensation time; adding, by the first sending end, the first timestamp compensation time to a first timestamp carried in a first cell, where the first timestamp is a sending time of the first cell; and sending, by the first sending end to a receiving end, the first cell that is added with the first timestamp compensation time, so that the receiving end forwards the first cell according to the first timestamp that is added with the first timestamp compensation time. In the present invention, a first timestamp compensation time is added to a first timestamp carried in a first cell, which improves cell forwarding efficiency of the receiving end and prevents the occurrence of cell accumulation in a link.

14 Claims, 6 Drawing Sheets

(56) References Cited

FOREIGN PATENT DOCUMENTS

| | | |
|---|---|---|
| CN | 102136968 A | 7/2011 |
| CN | 102158402 A | 8/2011 |
| CN | 102244603 A | 11/2011 |
| CN | 102792642 A | 11/2012 |
| CN | 103684647 A | 3/2014 |
| EP | 0587944 A1 | 3/1994 |
| EP | 2490380 A2 | 8/2012 |
| WO | WO 02060132 A1 | 8/2002 |

* cited by examiner

| Timestamp | Source identification number | Cell number | Cell length | Reserved information | Cell payload |

| First timestamp + First timestamp compensation time | Source identification number | Cell number | Cell length | Reserved information | Cell payload |

CELL PROCESSING METHOD AND APPARATUS

CROSS-REFERENCE TO RELATED APPLICATION

This application claims priority to Chinese Patent Application No. 201410209901.1, filed on May 16, 2014, which is hereby incorporated by reference in its entirety.

TECHNICAL FIELD

Embodiments of the present invention relate to communications technologies, and in particular, to a cell processing method and apparatus.

BACKGROUND

In the communications field, an ingress port of a switching device receives a data packet and splits the data packet into multiple cells, and the cells pass, inside the switching device, through multiple switching units, and reach an egress port of the switching device along different paths. The egress port sequences the multiple cells, and then sends the multiple cells.

FIG. 1 shows a switching structure inside one switching device, where a fabric interface chip (Fabric Interface Chip, FIC for short) and a sending port S1/3 are located in a same line card chassis (Line Card Chassis, LCC for short), and a sending port S2 is located in a fabric card chassis (Fabric Card Chassis, FCC for short). The sending port S1/3 includes a sending port S1 and a sending port S3, and S1/3 is connected to the FIC through S1, and S1/3 is connected to S2 through S3. If the FIC receives a data packet sent by another switching device and splits the data packet into multiple cells, the cells are forwarded from the FIC to S2 through S1/3, and then forwarded to a destination S1/3 through S2, the destination S1/3 forwards the cells to a destination FIC, and finally the destination FIC sends the cells to another switching device.

FIG. 2 shows a format diagram of a cell frame, where the first field in the cell frame is a timestamp TS, which indicates a timestamp of a time when an FIC sends the cell. S1, S2, and S3 forward the cells according to TS values, where a cell whose TS value is smaller is forwarded first and a cell whose TS value is larger is forwarded later. For example, an FIC in an LCC A and an FIC in an LCC B send cells C1 and C2 at a same time T1 respectively, where C1 and C2 carry a same timestamp T1. Before C1 and C2 enter an optical fiber link L1 and an optical fiber link L2 respectively, both L1 and L2 bear cells whose timestamps are less than T1. If L1 is longer than L2, cells that are borne in L1 and whose timestamps are less than T1 are more than cells that are borne in L2 and whose timestamps are less than T1, and C2 reaches S2 earlier than C1 does. Because S2 forwards a cell whose TS value is smaller first, and forwards a cell a cell whose TS value is larger later, after C2 reaches S2, C2 can be forwarded only after S2 completes forwarding the cells that are borne in L1 and whose timestamps are less than T1, that is, C2 can be forwarded by S2 only after C1 has reached S2. If L1 is much longer than L2, C2 needs to wait a quite long time before being forwarded by S2, which causes low cell forwarding efficiency of S2; in addition, during the waiting time of the cell C2, the FIC in the LCC B keeps sending new cells, which causes cell accumulation in L2.

SUMMARY

Embodiments of the present invention provide a cell processing method and apparatus, to improve cell forwarding efficiency of a switching device, and prevent internal cell accumulation.

One aspect of the embodiments of the present invention provides a cell processing method, including:

obtaining, by a first sending end, a first timestamp compensation time, where the first timestamp compensation time is T1−Tmin, where T1 is a delay time, which is from the first sending end to a receiving end, of a first cell sent by the first sending end, Tmin is a minimum value of a delay time, which is from each sending end in multiple sending ends to the receiving end, of a cell sent by a respective sending end, and the multiple sending ends include the first sending end;

adding, by the first sending end, the first timestamp compensation time to a first timestamp carried in the first cell, where the first timestamp is a sending time of the first cell; and sending, by the first sending end to the receiving end, the first cell that is added with the first timestamp compensation time, so that the receiving end forwards the first cell according to the first timestamp that is added with the first timestamp compensation time.

Another aspect of the embodiments of the present invention provides a cell processing method, including:

receiving, by a receiving end, a first cell that is added with a first timestamp compensation time and sent by a first sending end, where the first timestamp compensation time is T1−Tmin added by the first sending end to a first timestamp carried in the first cell, where the first timestamp is a sending time of the first cell, T1 is a delay time, which is from the first sending end to the receiving end, of the first cell sent by the first sending end, Tmin is a minimum value of a delay time, which is from each sending end in multiple sending ends to the receiving end, of a cell sent by a respective sending end, and the multiple sending ends include the first sending end; and forwarding, by the receiving end, the first cell according to the first timestamp that is added with the first timestamp compensation time.

Another aspect of the embodiments of the present invention provides a cell processing method, including:

obtaining, by a first sending end, a first timestamp compensation time, where the first timestamp compensation time is a delay time, which is from the first sending end to a receiving end, of a first cell sent by the first sending end;

adding, by the first sending end, the first timestamp compensation time to a first timestamp carried in the first cell, where the first timestamp is a sending time of the first cell; and sending, by the first sending end to the receiving end, the first cell that is added with the first timestamp compensation time, so that the receiving end forwards the first cell according to the first timestamp that is added with the first timestamp compensation time.

Another aspect of the embodiments of the present invention provides a cell processing method, including:

receiving, by a receiving end, a first cell that is added with a first timestamp compensation time and sent by a first sending end, where the first timestamp compensation time is a delay time, which is added by the first sending end to a first timestamp carried in the first cell and is from the first sending end to the receiving end, of the first cell, and the first timestamp is a sending time of the first cell; and forwarding, by the receiving end, the first cell according to the first timestamp that is added with the first timestamp compensation time.

Another aspect of the embodiments of the present invention provides a first sending end, including:

an obtaining module, configured to obtain a first timestamp compensation time, where the first timestamp compensation time is T1−Tmin, where T1 is a delay time, which is from the first sending end to a receiving end, of a first cell sent by the first sending end, Tmin is a minimum value of a delay time, which is from each sending end in multiple sending ends to the receiving end, of a cell sent by a respective sending end, and the multiple sending ends include the first sending end;

an adding module, configured to add the first timestamp compensation time to a first timestamp carried in the first cell, where the first timestamp is a sending time of the first cell; and a sending module, configured to send, to the receiving end, the first cell that is added with the first timestamp compensation time, so that the receiving end forwards the first cell according to the first timestamp that is added with the first timestamp compensation time.

Another aspect of the embodiments of the present invention provides a receiving end, including:

a receiving module, configured to receive a first cell that is added with a first timestamp compensation time and sent by a first sending end, where the first timestamp compensation time is T1−Tmin added by the first sending end to a first timestamp carried in the first cell, where the first timestamp is a sending time of the first cell, T1 is a delay time, which is from the first sending end to the receiving end, of the first cell sent by the first sending end, Tmin is a minimum value of a delay time, which is from each sending end in multiple sending ends to the receiving end, of a cell sent by a respective sending end, and the multiple sending ends include the first sending end; and a forwarding module, configured to forward the first cell according to the first timestamp that is added with the first timestamp compensation time.

Another aspect of the embodiments of the present invention provides a first sending end, including:

an obtaining module, configured to obtain a first timestamp compensation time, where the first timestamp compensation time is a delay time, which is from the first sending end to a receiving end, of a first cell sent by the first sending end;

an adding module, configured to add the first timestamp compensation time to a first timestamp carried in the first cell, where the first timestamp is a sending time of the first cell; and a sending module, configured to send, to the receiving end, the first cell that is added with the first timestamp compensation time, so that the receiving end forwards the first cell according to the first timestamp that is added with the first timestamp compensation time.

Another aspect of the embodiments of the present invention provides a receiving end, including:

a receiving module, configured to receive a first cell that is added with a first timestamp compensation time and sent by a first sending end, where the first timestamp compensation time is a delay time, which is added by the first sending end to a first timestamp carried in the first cell and is from the first sending end to the receiving end, of the first cell, and the first timestamp is a sending time of the first cell; and a forwarding module, configured to forward the first cell according to the first timestamp that is added with the first timestamp compensation time.

Another aspect of the embodiments of the present invention provides a cell processing system, including at least two of the first sending ends and the receiving end.

According to the cell processing method and apparatus provided in the embodiments of the present invention, a first timestamp compensation time is added to a first timestamp carried in a first cell, so that a receiving end forwards the first cell according to the first timestamp that is added with the first timestamp compensation time, to prevent a second cell, which is sent by a second sending end, from waiting at the receiving end for a cell that is sent by a first sending end at a time the same as a sending time of the second cell, where the cell reaches the receiving end after a longer delay time than a delay time after which the second cell reaches the receiving end, which improves cell forwarding efficiency of the receiving end and prevents the occurrence of cell accumulation in a link connected to the receiving end.

DESCRIPTION OF EMBODIMENTS

Figures 4, 5:
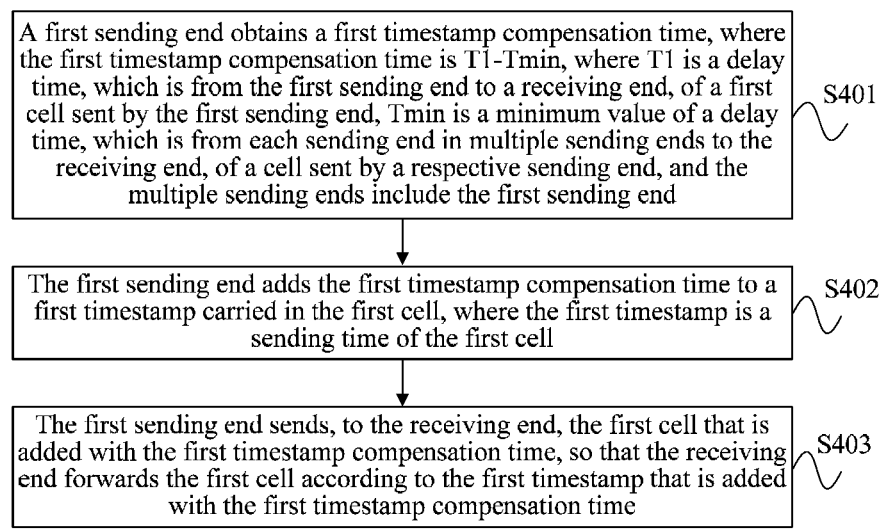
FIG. 4 is a flowchart of a cell processing method according to an embodiment of the present invention.
FIG. 5 is a structure of a cell frame applicable to a cell processing method according to an embodiment of the present invention.

FIG. 4 is a flowchart of a cell processing method according to an embodiment of the present invention. The cell processing method provided by this embodiment of the present invention is applicable to a process in which a source FIC of a switching device splits a received data packet sent by another switching device into multiple cells, and the multiple cells are forwarded among sending ports S1, S2, and S3 inside the switching device. Specific steps of the cell processing method provided by this embodiment of the present invention are as follows:

Step S401: A first sending end obtains a first timestamp compensation time, where the first timestamp compensation time is T1−Tmin, where T1 is a delay time, which is from the first sending end to a receiving end, of a first cell sent by the first sending end, Tmin is a minimum value of a delay time, which is from each sending end in multiple sending ends to the receiving end, of a cell sent by a respective sending end, and the multiple sending ends include the first sending end.

Figures 1, 2:
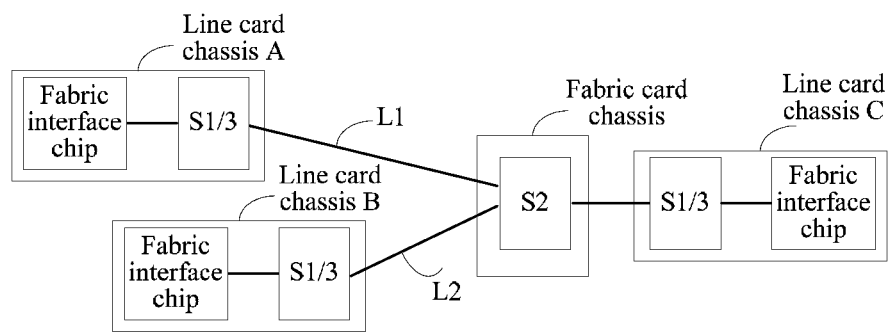
FIG. 1 is an internal structural diagram of a switching device in the prior art.
FIG. 2 is a format diagram of a cell frame in the prior art.
Figure 3:
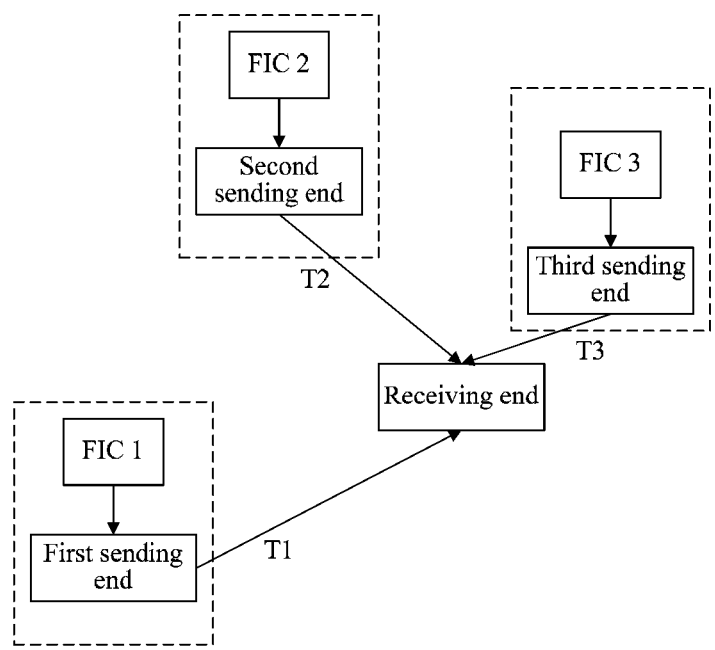
FIG. 3 is a cell forwarding diagram corresponding to a cell processing method according to an embodiment of the present invention.

FIG. 3 is a cell forwarding diagram corresponding to a cell processing method according to an embodiment of the present invention. As shown in FIG. 3, a first sending end, a second sending end, and a third sending end are different sending ports S1 inside a switching device, a receiving end is a sending port S2 inside the switching device, the first sending end sends a first cell to the receiving end, and a delay time, which is from the first sending end to the receiving end, of the first cell is T1 (for example, 60 minutes); the second sending end sends a second cell to the receiving end, and a delay time, which is from the second sending end to the receiving end, of the second cell is T2 (for example, 30 minutes); the third sending end sends a third cell to the receiving end, and a delay time, which is from the third sending end to the receiving end, of the third cell is T3 (for example, 10 minutes), where T1>T2>T3; and T3 is a minimum value of a delay time, which is from each sending end in multiple sending ends to the receiving end, of a cell sent by a respective sending end, and the first timestamp compensation time obtained by the first sending end is T1−T3.

Step S402: The first sending end adds the first timestamp compensation time to a first timestamp carried in the first cell, where the first timestamp is a sending time of the first cell.

The first sending end adds the obtained first timestamp compensation time to the first timestamp in the first cell, where the first timestamp indicates a sending time when the first sending end sends the first cell.

Step S403: The first sending end sends, to the receiving end, the first cell that is added with the first timestamp compensation time, so that the receiving end forwards the first cell according to the first timestamp that is added with the first timestamp compensation time.

The first sending end sends, to the receiving end, the first cell that is added with the first timestamp compensation time, and the receiving end forwards the first cell according to the first timestamp that is added with the first timestamp compensation time. Specifically, as shown in FIG. 3, the first sending end sends the first cell at a time t1, where the first cell carries a first timestamp t1 and an added first timestamp compensation time 50 minutes (60 minutes-10 minutes). FIG. 5 is a structure of a cell frame applicable to a cell processing method according to an embodiment of the present invention. As shown in FIG. 5, the first field in the cell frame applicable to this embodiment of the present invention indicates timestamp information that is added with the first timestamp compensation time, and then timestamp information corresponding to the first cell is t1+50 minutes. The second sending end sends the second cell at a time t2, where the second cell carries a second timestamp t2 and an added second timestamp compensation time 20 minutes (30 minutes−10 minutes), that is, timestamp information corresponding to the second cell is t2+20 minutes. The third sending end sends the third cell at a time t3, where the third cell carries a third timestamp t3 and an added third timestamp compensation time 0 minutes (10 minutes−10 minutes), that is, timestamp information corresponding to the third cell is t3. The receiving end compares values of the timestamp information separately carried in the currently received first cell, second cell, and third cell, and forwards the cell whose timestamp information has a minimum value; specifically, the receiving end receives the cells sent by the first sending end, the second sending end, and the third sending end, sequences the cells according to an ascending order of the values of the timestamp information carried in the cells, and sends the sequenced cells successively.

For example, the receiving end may receive at the same time a third cell sent at 5:50 by the third sending end, a second cell that carries timestamp information being 5:50 and is sent at 5:30 by the second sending end, and a first cell that carries timestamp information being 5:50 and is sent at 5:00 by the first sending end, and the receiving end sends at the same time the cells that are received at the same time. If each sending end does not add a timestamp compensation time to a cell, and each sending end keeps sending cells, because the cells sent at the same time of 5:50 by the first sending end, the second sending end, and the third sending end need to respectively take 60 minutes, 30 minutes, and 10 minutes to reach the receiving end, the cell sent at 5:50 by the third sending end reaches the receiving end first, the cells sent at 5:50 by the first sending end and the second sending end reach the receiving end later, and when the cell sent at 5:50 by the third sending end reaches the receiving end, the cells that are sent by the first sending end and the second sending end and received by the receiving end must be cells sent at times earlier than 5:50, that is, the receiving end first forwards cells that are sent before 5:50 by the first sending end and the second sending end; and similarly, the cell sent at 5:50 by the second sending end reaches the receiving end first, the cell sent at 5:50 by the first sending end reaches the receiving end later, when the cell sent at 5:50 by the second sending end reaches the receiving end, the receiving end first forwards a cell sent before 5:50 by the first sending end, and the cells that are sent at 5:50 by the second sending end and the third sending end are forwarded only after the cell sent at 5:50 by the first sending end reaches the receiving end, that is, for cells sent at a same time by the sending ends, a cell that reaches the receiving end first can be forwarded only after a cell that reaches the receiving end later reaches the receiving end. In this embodiment of the present invention, each sending end adds a timestamp compensation time to a cell, so that the third cell sent at 5:50 by the third sending end, the second cell that carries timestamp information being 5:50 and is sent at 5:30 by the second sending end, and the first cell that carries timestamp information being 5:50 and is sent at 5:00 by the first sending end are forwarded at the same time by the receiving end at the same time.

In addition, in this embodiment of the present invention, besides being added by a sending end, a timestamp compensation time may also be added by an FIC connected to the sending end or an input port of a receiving end. In this embodiment of the present invention, a first timestamp compensation time is added to a first timestamp carried in a first cell, so that a receiving end forwards the first cell according to the first timestamp that is added with the first timestamp compensation time, to prevent a second cell, which is sent by a second sending end, from waiting at the receiving end for a cell that is sent by a first sending end at a time the same as a sending time of the second cell, where the cell reaches the receiving end after a longer delay time than a delay time after which the second cell reaches the receiving end, which improves cell forwarding efficiency of the receiving end and prevents the occurrence of cell accumulation in a link connected to the receiving end.

Based on the foregoing embodiment, that the first sending end obtains the first timestamp compensation time includes that: the first sending end obtains, according to a foreknown length of a link between each sending end in the multiple sending ends and the receiving end, the delay time, which is from each sending end in the multiple sending ends to the receiving end, of the cell sent by the respective sending end, and obtains the first timestamp compensation time.

The length of a link between each sending end and the receiving end is prestored in the first sending end. The first sending end obtains, according to the length of a link and a transmission rate of a cell in the link, a delay time, which is from each sending end to the receiving end, of the cell sent by the respective sending end, including a delay time T1, which is from the first sending end to the receiving end, of the first cell sent by the first sending end, and the minimum value Tmin of a delay time, which is from each sending end to the receiving end, of the cell sent by a respective sending end, so as to obtain the first timestamp compensation time T1−Tmin.

In this embodiment of the present invention, the delay time, which is from each sending end in the multiple sending ends to the receiving end, of the cell sent by the respective sending end includes a delay of transmitting the cell on the link between the respective sending end and the receiving end, and a delay of processing the cell by the respective sending end.

In this embodiment of the present invention, a manner of calculating a first timestamp compensation time and a delay time, which is from a sending end to a receiving end, of a cell are specifically limited, which improves calculation accuracy.

Figure 6:
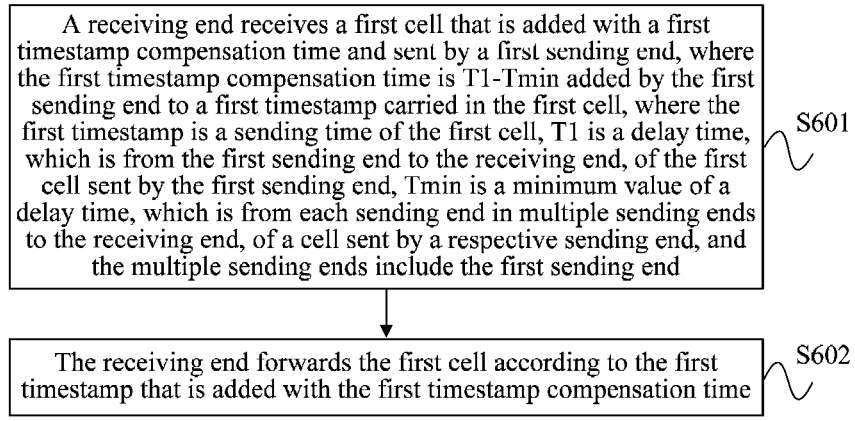
FIG. 6 is a flowchart of a cell processing method according to another embodiment of the present invention.

FIG. 6 is a flowchart of a cell processing method according to another embodiment of the present invention. As shown in FIG. 6, specific steps of the cell processing method provided by this embodiment of the present invention are as follows:

Step S601: A receiving end receives a first cell that is added with a first timestamp compensation time and sent by a first sending end, where the first timestamp compensation time is T1−Tmin added by the first sending end to a first timestamp carried in the first cell, where the first timestamp is a sending time of the first cell, T1 is a delay time, which is from the first sending end to the receiving end, of the first cell sent by the first sending end, Tmin is a minimum value of a delay time, which is from each sending end in multiple sending ends to the receiving end, of a cell sent by a respective sending end, and the multiple sending ends include the first sending end.

FIG. 3 is a cell forwarding diagram corresponding to a cell processing method according to an embodiment of the present invention. As shown in FIG. 3, a first sending end, a second sending end, and a third sending end are different sending ports S1 inside a switching device, a receiving end is a sending port S2 inside the switching device, the first sending end sends a first cell to the receiving end, and a delay time, which is from the first sending end to the receiving end, of the first cell is T1 (for example, 60 minutes); the second sending end sends a second cell to the receiving end, and a delay time, which is from the second sending end to the receiving end, of the second cell is T2 (for example, 30 minutes); the third sending end sends a third cell to the receiving end, and a delay time, which is from the third sending end to the receiving end, of the third cell is T3 (for example, 10 minutes), where T1>T2>T3; T3 is a minimum value of a delay time, which is from each sending end in multiple sending ends to the receiving end, of a cell sent by a respective sending end, and the first time stamp compensation time obtained by the first sending end is T1−T3; and the first sending end adds the obtained first timestamp compensation time to a first timestamp in the first cell, where the first timestamp indicates a sending time when the first sending end sends the first cell.

Step S602: The receiving end forwards the first cell according to the first timestamp that is added with the first timestamp compensation time.

In this embodiment of the present invention, the cell processing method further includes: receiving, by the receiving end, a second cell that carries a second timestamp and is sent by a second sending end, where the second timestamp includes a second timestamp compensation time and a sending time of the second cell, the second timestamp compensation time is T2−Tmin, and T2 is a delay time, which is from the second sending end to the receiving end, of the second cell.

That the receiving end forwards the first cell according to the first time stamp that is added with the first timestamp compensation time includes that: the receiving end forwards the first cell according to the first timestamp that is added with the first timestamp compensation time and carried in the first cell and the second timestamp carried in the second cell.

The receiving end forwards the first cell according to the first timestamp that is added with the first timestamp compensation time. Specifically, as shown in FIG. 3, the first sending end sends the first cell at a time t1, where the first cell carries a first timestamp t1 and an added first timestamp compensation time 50 minutes (60 minutes−10 minutes). FIG. 5 is a structure of a cell frame applicable to a cell processing method according to an embodiment of the present invention. As shown in FIG. 5, the first field in the cell frame applicable to this embodiment of the present invention indicates timestamp information that is added with the first timestamp compensation time, and then timestamp information corresponding to the first cell is t1+50 minutes. The second sending end sends the second cell at a time t2, where the second cell carries a second timestamp t2 and an added second timestamp compensation time 20 minutes (30 minutes−10 minutes), that is, timestamp information corresponding to the second cell is t2+20 minutes. The third sending end sends the third cell at a time t3, where the third cell carries a third timestamp t3 and an added third timestamp compensation time 0 minutes (10 minutes−10 minutes), that is, timestamp information corresponding to the third cell is t3. The receiving end compares values of the timestamp information separately carried in the currently received first cell, second cell, and third cell, and forwards the cell whose timestamp information has a minimum value; specifically, the receiving end receives the cells sent by the first sending end, the second sending end, and the third sending end, sequences the cells according to an ascending order of the values of the timestamp information carried in the cells, and sends the sequenced cells successively.

For example, the receiving end may receive at the same time a third cell sent at 5:50 by the third sending end, a second cell that carries timestamp information being 5:50 and is sent at 5:30 by the second sending end, and a first cell that carries timestamp information being 5:50 and is sent at 5:00 by the first sending end, and the receiving end sends at the same time the cells that are received at the same time. If each sending end does not add a timestamp compensation time to a cell, and each sending end keeps sending cells, because the cells sent at the same time of 5:50 by the first sending end, the second sending end, and the third sending end need to respectively take 60 minutes, 30 minutes, and 10 minutes to reach the receiving end, the cell sent at 5:50 by the third sending end reaches the receiving end first, the cells sent at 5:50 by the first sending end and the second sending end reach the receiving end later, and when the cell sent at 5:50 by the third sending end reaches the receiving end, the cells that are sent by the first sending end and the second sending end and received by the receiving end must be cells sent at times earlier than 5:50, that is, the receiving end first forwards cells that are sent before 5:50 by the first sending end and the second sending end; and similarly, the cell sent at 5:50 by the second sending end reaches the receiving end first, the cell sent at 5:50 by the first sending end reaches the receiving end later, when the cell sent at 5:50 by the second sending end reaches the receiving end, the receiving end first forwards a cell sent before 5:50 by the first sending end, and the cells that are sent at 5:50 by the second sending end and the third sending end are forwarded only after the cell sent at 5:50 by the first sending end reaches the receiving end, that is, for cells sent at a same time by the sending ends, a cell that reaches the receiving end first can be forwarded only after a cell that reaches the receiving end later reaches the receiving end. In this embodiment of the present invention, each sending end adds a timestamp compensation time to a cell, so that the third cell sent at 5:50 by the third sending end, the second cell that carries timestamp information being 5:50 and is sent at 5:30 by the second sending end, and the first cell that carries timestamp information being 5:50 and is sent at 5:00 by the first sending end are forwarded by the receiving end at the same time.

In addition, in this embodiment of the present invention, besides being added by a sending end, a timestamp compensation time may also be added by an FIC connected to the sending end or an input port of a receiving end. In this embodiment of the present invention, a first timestamp compensation time is added to a first timestamp carried in a first cell, so that a receiving end forwards the first cell according to the first timestamp that is added with the first timestamp compensation time, to prevent a second cell, which is sent by a second sending end, from waiting at the receiving end for a cell that is sent by a first sending end at a time the same as a sending time of the second cell, where the cell reaches the receiving end after a longer delay time than a delay time after which the second cell reaches the receiving end, which improves cell forwarding efficiency of the receiving end and prevents the occurrence of cell accumulation in a link connected to the receiving end.

Based on the foregoing embodiment, the delay time, which is from each sending end in the multiple sending ends to the receiving end, of the cell sent by the respective sending end includes a delay of transmitting the cell on a link between the respective sending end and the receiving end, and a delay of processing the cell by the respective sending end.

In this embodiment of the present invention, a delay time, which is from a sending end to a receiving end, of a cell is specifically limited, which improves calculation accuracy.

Figure 7:
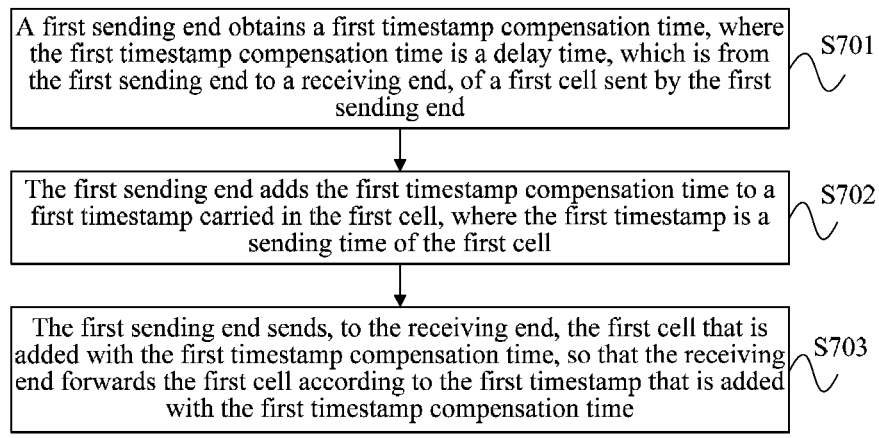
FIG. 7 is a flowchart of a cell processing method according to another embodiment of the present invention.

FIG. 7 is a flowchart of a cell processing method according to another embodiment of the present invention. As shown in FIG. 7, specific steps of the cell processing method provided by this embodiment of the present invention are as follows:

Step S701: A first sending end obtains a first timestamp compensation time, where the first timestamp compensation time is a delay time, which is from the first sending end to a receiving end, of a first cell sent by the first sending end.

FIG. 3 is a cell forwarding diagram corresponding to a cell processing method according to an embodiment of the present invention. As shown in FIG. 3, a first sending end, a second sending end, and a third sending end are different sending ports S1 inside a switching device, the receiving end is a sending port S2 inside the switching device, the first sending end sends a first cell to the receiving end, and a delay time, which is from the first sending end to the receiving end, of the first cell is T1 (for example, 60 minutes); the second sending end sends a second cell to the receiving end, and a delay time, which is from the second sending end to the receiving end, of the second cell is T2 (for example, 30 minutes); and the third sending end sends a third cell to the receiving end, a delay time, which is from the third sending end to the receiving end, of the third cell is T3 (for example, 10 minutes), and the first timestamp compensation time obtained by the first sending end is T1.

Step S702: The first sending end adds the first timestamp compensation time to a first timestamp carried in the first cell, where the first timestamp is a sending time of the first cell.

The first sending end adds the obtained first time stamp compensation time to the first timestamp in the first cell, where the first timestamp indicates a sending time when the first sending end sends the first cell.

Step S703: The first sending end sends, to the receiving end, the first cell that is added with the first timestamp compensation time, so that the receiving end forwards the first cell according to the first timestamp that is added with the first timestamp compensation time.

The first sending end sends, to the receiving end, the first cell that is added with the first timestamp compensation time, and the receiving end forwards the first cell according to the first timestamp that is added with the first timestamp compensation time. Specifically, as shown in FIG. 3, the first sending end sends the first cell at a time t1, where the first cell carries a first timestamp t1 and an added first timestamp compensation time 60 minutes. FIG. 5 is a structure of a cell frame applicable to a cell processing method according to an embodiment of the present invention. As shown in FIG. 5, the first field in the cell frame applicable to this embodiment of the present invention indicates timestamp information that is added with the first timestamp compensation time, and then timestamp information corresponding to the first cell is t1+60 minutes. The second sending end sends the second cell at a time t2, where the second cell carries a second timestamp t2 and an added second timestamp compensation time 30 minutes, that is, timestamp information corresponding to the second cell is t2+30 minutes. The third sending end sends the third cell at a time t3, where the third cell carries a third timestamp t3 and an added third timestamp compensation time 10 minutes, that is, timestamp information corresponding to the third cell is t3+10 minutes. The receiving end compares values of the timestamp information separately carried in the currently received first cell, second cell, and third cell, and forwards the cell whose timestamp information has a minimum value; specifically, the receiving end receives the cells sent by the first sending end, the second sending end, and the third sending end, sequences the cells according to an ascending order of the values of the timestamp information carried in the cells, and sends the sequenced cells successively.

For example, the receiving end may receive at the same time a third cell that carries timestamp information being 6:00 and is sent at 5:50 by the third sending end, a second cell that carries timestamp information being 6:00 and is sent at 5:30 by the second sending end, and a first cell that carries timestamp information being 6:00 and is sent at 5:00 by the first sending end, and the receiving end sends at the same time the cells that are received at the same time. If each sending end does not add a timestamp compensation time to a cell, and each sending end keeps sending cells, because the cells sent at the same time of 5:50 by the first sending end, the second sending end, and the third sending end need to respectively take 60 minutes, 30 minutes, and 10 minutes to reach the receiving end, the cell sent at 5:50 by the third sending end reaches the receiving end first, the cells sent at 5:50 by the first sending end and the second sending end reach the receiving end later, and when the cell sent at 5:50 by the third sending end reaches the receiving end, the cells that are sent by the first sending end and the second sending end and received by the receiving end must be cells sent at times earlier than 5:50, that is, the receiving end first forwards cells that are sent before 5:50 by the first sending end and the second sending end; and similarly, the cell sent at 5:50 by the second sending end reaches the receiving end first, the cell sent at 5:50 by the first sending end reaches the receiving end later, when the cell sent at 5:50 by the second sending end reaches the receiving end, the receiving end first forwards a cell sent before 5:50 by the first sending end, and the cells that are sent at 5:50 by the second sending end and the third sending end are forwarded only after the cell sent at 5:50 by the first sending end reaches the receiving end, that is, for cells sent at a same time by the sending ends, a cell that reaches the receiving end first can be forwarded only after a cell that reaches the receiving end later reaches the receiving end. In this embodiment of the present invention, each sending end adds a timestamp compensation time to a cell, so that the third cell that carries timestamp information being 6:00 and is sent at 5:50 by the third sending end, the second cell that carries timestamp information being 6:00 and is sent at 5:30 by the second sending end, and the first cell that carries timestamp information being 6:00 and is sent at 5:00 by the first sending end are forwarded by the receiving end at the same time.

In addition, in this embodiment of the present invention, besides being added by a sending end, a timestamp compensation time may also be added by an FIC connected to the sending end or an input port of a receiving end. In this embodiment of the present invention, a first timestamp compensation time is added to a first timestamp carried in a first cell, so that a receiving end forwards the first cell according to the first timestamp that is added with the first timestamp compensation time, to prevent a second cell, which is sent by a second sending end, from waiting at the receiving end for a cell that is sent by a first sending end at a time the same as a sending time of the second cell, where the cell reaches the receiving end after a longer delay time than a delay time after which the second cell reaches the receiving end, which improves cell forwarding efficiency of the receiving end and prevents the occurrence of cell accumulation in a link connected to the receiving end.

Based on the foregoing embodiment, that the first sending end obtains the first timestamp compensation time includes that: the first sending end obtains the first timestamp compensation time according to a foreknown length of a link between the first sending end and the receiving end.

A length of a link between each sending end and the receiving end is prestored at the first sending end. The first sending end obtains, according to a length of a link and a transmission rate of a cell in the link, a delay time, which is from each sending end to the receiving end, of the cell sent by a respective sending end, including a delay time T1, which is from the first sending end to the receiving end, of the first cell sent by the first sending end, so as to obtain the first timestamp compensation time T1.

Based on this embodiment of the present invention, the delay time, which is from the first sending end to the receiving end, of the first cell sent by the first sending end includes a delay of transmitting the first cell on the link between the first sending end and the receiving end, and a delay of processing the first cell by the first sending end.

In this embodiment of the present invention, a manner of calculating a first timestamp compensation time and a delay time, which is from a sending end to a receiving end, of a cell are specifically limited, which improves calculation accuracy.

Figure 8:
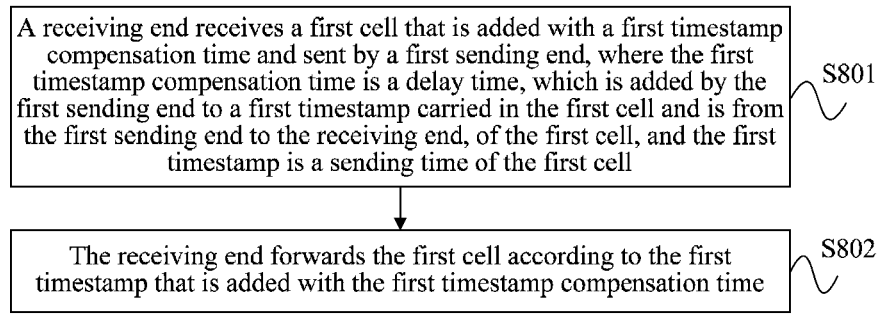
FIG. 8 is a flowchart of a cell processing method according to another embodiment of the present invention.

FIG. 8 is a flowchart of a cell processing method according to another embodiment of the present invention. As shown in FIG. 8, specific steps of the cell processing method provided by this embodiment of the present invention are as follows:

Step S801: A receiving end receives a first cell that is added with a first timestamp compensation time and sent by a first sending end, where the first timestamp compensation time is a delay time, which is added by the first sending end to a first timestamp carried in the first cell and is from the first sending end to the receiving end, of the first cell, and the first timestamp is a sending time of the first cell.

FIG. 3 is a cell forwarding diagram corresponding to a cell processing method according to an embodiment of the present invention. As shown in FIG. 3, a first sending end, a second sending end, and a third sending end are different sending ports S1 inside a switching device, a receiving end is a sending port S2 inside the switching device, the first sending end sends a first cell to the receiving end, and a delay time, which is from the first sending end to the receiving end, of the first cell is T1 (for example, 60 minutes); the second sending end sends a second cell to the receiving end, and a delay time, which is from the second sending end to the receiving end, of the second cell is T2 (for example, 30 minutes); the third sending end sends a third cell to the receiving end, a delay time, which is from the third sending end to the receiving end, of the third cell is T3 (for example, 10 minutes), and the first timestamp compensation time obtained by the first sending end is T1; and the first sending end adds the obtained first timestamp compensation time to a first timestamp in the first cell, where the first timestamp indicates a sending time when the first sending end sends the first cell.

Step S802: The receiving end forwards the first cell according to the first timestamp that is added with the first timestamp compensation time.

Based on this embodiment of the present invention, the cell processing method further includes: receiving, by the receiving end, a second cell that carries a second timestamp and is sent by a second sending end, where the second timestamp includes a second timestamp compensation time and a sending time of the second cell, and the second timestamp compensation time is a delay time, which is from the second sending end to the receiving end, of the second cell.

That the receiving end forwards the first cell according to the first timestamp that is added with the first timestamp compensation time includes that: the receiving end forwards the first cell according to the first timestamp that is added with the first timestamp compensation time and carried in the first cell and the second timestamp carried in the second cell.

The receiving end forwards the first cell according to the first timestamp that is added with the first timestamp compensation time. Specifically, as shown in FIG. 3, the first sending end sends the first cell at a time t1, where the first cell carries a first timestamp t1 and an added first timestamp compensation time 60 minutes. FIG. 5 is a structure of a cell frame applicable to a cell processing method according to an embodiment of the present invention. As shown in FIG. 5, the first field in the cell frame applicable to this embodiment of the present invention indicates timestamp information that is added with the first timestamp compensation time, and then timestamp information corresponding to the first cell is t1+60 minutes. The second sending end sends the second cell at a time t2, where the second cell carries a second timestamp t2 and an added second timestamp compensation time 30 minutes, that is, timestamp information corresponding to the second cell is t2+30 minutes. The third sending end sends the third cell at a time t3, where the third cell carries a third timestamp t3 and an added third timestamp compensation time 10 minutes, that is, timestamp information corresponding to the third cell is t3+10 minutes. The receiving end compares values of the timestamp information separately carried in the currently received first cell, second cell, and third cell, and forwards the cell whose timestamp information has the minimum value; specifically, the receiving end receives the cells sent by the first sending end, the second sending end, and the third sending end, sequences the cells according to an ascending order of the values of the timestamp information carried in the cells, and sends the sequenced cells successively.

For example, the receiving end may receive at the same time a third cell that carries timestamp information being 6:00 and is sent at 5:50 by the third sending end, a second cell that carries timestamp information being 6:00 and is sent at 5:30 by the second sending end, and a first cell that carries timestamp information being 6:00 and is sent at 5:00 by the first sending end, and the receiving end sends at the same time the cells that are received at the same time. If each sending end does not add a timestamp compensation time to a cell, and each sending end keeps sending cells, because the cells sent at the same time of 5:50 by the first sending end, the second sending end, and the third sending end need to respectively take 60 minutes, 30 minutes, and 10 minutes to reach the receiving end, the cell sent at 5:50 by the third sending end reaches the receiving end first, the cells sent at 5:50 by the first sending end and the second sending end reach the receiving end later, and when the cell sent at 5:50 by the third sending end reaches the receiving end, the cells that are sent by the first sending end and the second sending end and received by the receiving end must be cells sent at times earlier than 5:50, that is, the receiving end first forwards cells that are sent before 5:50 by the first sending end and the second sending end; and similarly, the cell sent at 5:50 by the second sending end reaches the receiving end first, the cell sent at 5:50 by the first sending end reaches the receiving end later, when the cell sent at 5:50 by the second sending end reaches the receiving end, the receiving end first forwards a cell sent before 5:50 by the first sending end, and the cells that are sent at 5:50 by the second sending end and the third sending end are forwarded only after the cell sent at 5:50 by the first sending end reaches the receiving end, that is, for cells sent at a same time by the sending ends, a cell that reaches the receiving end first can be forwarded only after a cell that reaches the receiving end later reaches the receiving end. In this embodiment of the present invention, each sending end adds a timestamp compensation time to a cell, so that the third cell that carries timestamp information being 6:00 and is sent at 5:50 by the third sending end, the second cell that carries timestamp information being 6:00 and is sent at 5:30 by the second sending end, and the first cell that carries timestamp information being 6:00 and is sent at 5:00 by the first sending end are forwarded by the receiving end at the same time.

In addition, in this embodiment of the present invention, besides being added by a sending end, a timestamp compensation time may also be added by an FIC connected to the sending end or an input port of a receiving end.

In this embodiment of the present invention, a first timestamp compensation time is added to a first timestamp carried in a first cell, so that a receiving end forwards the first cell according to the first timestamp that is added with the first timestamp compensation time, to prevent a second cell, which is sent by a second sending end, from waiting at the receiving end for a cell that is sent by a first sending end at a time the same as a sending time of the second cell, where the cell reaches the receiving end after a longer delay time than a delay time after which the second cell reaches the receiving end, which improves cell forwarding efficiency of the receiving end and prevents the occurrence of cell accumulation in a link connected to the receiving end.

Based on the foregoing embodiment, the delay time, which is from the first sending end to the receiving end, of the first cell sent by the first sending end includes a delay of transmitting the first cell on a link between the first sending end and the receiving end, and a delay of processing the first cell by the first sending end.

In this embodiment of the present invention, a delay time, which is from a sending end to a receiving end, of a cell is specifically limited, which improves calculation accuracy.

Figure 9:
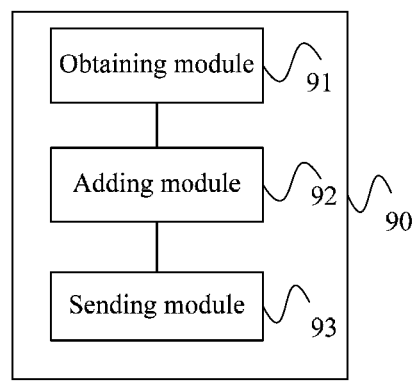
FIG. 9 is a structural diagram of a first sending end according to another embodiment of the present invention.

In the foregoing embodiment, the first sending end and the second sending end may also be different sending ports S2 inside the switching device, and correspondingly, the receiving end is a sending port S3 inside the switching device; the first timestamp information carried in the first cell includes the first timestamp that identifies a first sending time; and first timestamp compensation information added by the first sending end or an input port of the receiving end to first timestamp information is the delay time, which is from the first sending end to the receiving end, of the first cell, where the first timestamp information carried in the first cell may further include the delay time, which is from S1 to S2, of the first cell;

alternatively, the first sending end and the second sending end are different sending ports S2 inside the switching device; correspondingly, the receiving end is a sending port S3 inside the switching device; the first timestamp information carried in the first cell includes the first timestamp that identifies a first sending time; and first timestamp compensation information added by the first sending end or an input port of the receiving end to first timestamp information is a delay time, which is from S1 to S3 after passing through S2, of the first cell. FIG. 9 is a structural diagram of a first sending end according to another embodiment of the present invention. The first sending end provided by this embodiment of the present invention may execute a processing procedure provided by a cell processing method. As shown in FIG. 9, a first sending end 90 includes an obtaining module 91, an adding module 92, and a sending module 93, where the obtaining module 91 is configured to obtain a first timestamp compensation time, where the first timestamp compensation time is T1−Tmin, where T1 is a delay time, which is from the first sending end to a receiving end, of a first cell sent by the first sending end, Tmin is a minimum value of a delay time, which is from each sending end in multiple sending ends to the receiving end, of a cell sent by a respective sending end, and the multiple sending ends include the first sending end; the adding module 92 is configured to add the first timestamp compensation time to a first timestamp carried in the first cell, and the first timestamp is a sending time of the first cell; and the sending module 93 is configured to send, to the receiving end, the first cell that is added with the first timestamp compensation time, so that the receiving end forwards the first cell according to the first timestamp that is added with the first timestamp compensation time.

The first sending end provided by this embodiment of the present invention may be specifically configured to execute the foregoing method embodiment provided by FIG. 4, and specific functions are not described again herein.

In this embodiment of the present invention, a first timestamp compensation time is added to a first timestamp carried in a first cell, so that a receiving end forwards the first cell according to the first timestamp that is added with the first timestamp compensation time, to prevent a second cell, which is sent by a second sending end, from waiting at the receiving end for a cell that is sent by a first sending end at a time the same as a sending time of the second cell, where the cell reaches the receiving end after a longer delay time than a delay time after which the second cell reaches the receiving end, which improves cell forwarding efficiency of the receiving end and prevents the occurrence of cell accumulation in a link connected to the receiving end.

Based on the foregoing embodiment, the obtaining module 91 is specifically configured to obtain, according to a foreknown length of a link between each sending end in the multiple sending ends and the receiving end, the delay time, which is from each sending end in the multiple sending ends to the receiving end, of the cell sent by the respective sending end, and obtain the first timestamp compensation time.

The delay time, which is from each sending end in the multiple sending ends to the receiving end, of the cell sent by the respective sending end includes a delay of transmitting the cell on the link between the respective sending end and the receiving end, and a delay of processing the cell by the respective sending end.

In this embodiment of the present invention, a method of calculating a first timestamp compensation time and a delay time, which is from a sending end to a receiving end, of a cell are specifically limited, which improves calculation accuracy.

Figure 10:
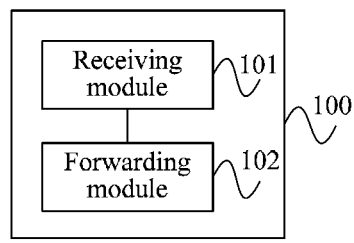
FIG. 10 is a structural diagram of a receiving end according to another embodiment of the present invention.

FIG. 10 is a structural diagram of a receiving end according to another embodiment of the present invention. The receiving end provided by this embodiment of the present invention may execute a processing procedure provided by an embodiment of a cell processing method. As shown in FIG. 10, a receiving end 100 includes a receiving module 101 and a forwarding module 102, where the receiving module 101 is configured to receive a first cell that is added with a first timestamp compensation time and sent by a first sending end, where the first timestamp compensation time is T1−Tmin added by the first sending end to a first timestamp carried in the first cell, where the first timestamp is a sending time of the first cell, T1 is a delay time, which is from the first sending end to the receiving end, of the first cell sent by the first sending end, Tmin is a minimum value of a delay time, which is from each sending end in multiple sending ends to the receiving end, of a cell sent by a respective sending end, and the multiple sending ends include the first sending end; and the forwarding module 102 is configured to forward the first cell according to the first timestamp that is added with the first timestamp compensation time.

Based on this embodiment of the present invention, the receiving module 101 is further configured to receive a second cell that carries a second timestamp and is sent by a second sending end, where the second timestamp includes a second timestamp compensation time and a sending time of the second cell, the second timestamp compensation time is T2−Tmin, and T2 is a delay time, which is from the second sending end to the receiving end, of the second cell.

The forwarding module 102 is specifically configured to forward the first cell according to the first timestamp that is added with the first timestamp compensation time and carried in the first cell and the second timestamp carried in the second cell.

The delay time, which is from each sending end in the multiple sending ends to the receiving end, of the cell sent by the respective sending end includes a delay of transmitting the cell on a link between the respective sending end and the receiving end, and a delay of processing the cell by the respective sending end.

The receiving end provided by this embodiment of the present invention may be specifically configured to execute the foregoing method embodiment provided by FIG. 6, and specific functions are not described again herein.

In this embodiment of the present invention, a first timestamp compensation time is added to a first timestamp carried in a first cell, so that a receiving end forwards the first cell according to the first timestamp that is added with the first timestamp compensation time, to prevent a second cell, which is sent by a second sending end, from waiting at the receiving end for a cell that is sent by a first sending end at a time the same as a sending time of the second cell, where the cell reaches the receiving end after a longer delay time than a delay time after which the second cell reaches the receiving end, which improves cell forwarding efficiency of the receiving end and prevents the occurrence of cell accumulation in a link connected to the receiving end; and a delay time, which is from a sending end to a receiving end, of a cell is specifically limited, which improves calculation accuracy.

Figure 11:
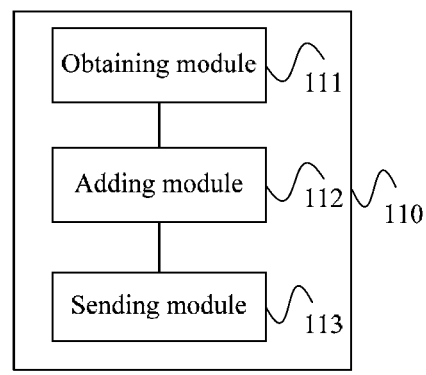
FIG. 11 is a structural diagram of a first sending end according to another embodiment of the present invention.

FIG. 11 is a structural diagram of a first sending end according to another embodiment of the present invention. The first sending end provided by this embodiment of the present invention may execute a processing procedure provided by an embodiment of a cell processing method. As shown in FIG. 11, a first sending end 110 includes an obtaining module 111, an adding module 112, and a sending module 113, where the obtaining module 111 is configured to obtain a first timestamp compensation time, where the first timestamp compensation time is a delay time, which is from the first sending end to a receiving end, of a first cell sent by the first sending end; the adding module 112 is configured to add the first timestamp compensation time to a first timestamp carried in the first cell, and the first timestamp is a sending time of the first cell; and the sending module 113 is configured to send, to the receiving end, the first cell that is added with the first timestamp compensation time, so that the receiving end forwards the first cell according to the first timestamp that is added with the first timestamp compensation time.

Based on this embodiment of the present invention, the obtaining module 111 is specifically configured to obtain the first timestamp compensation time according to a foreknown length of a link between the first sending end and the receiving end; and the delay time, which is from the first sending end to the receiving end, of the first cell sent by the first sending end includes a delay of transmitting the first cell on the link between the first sending end and the receiving end, and a delay of processing the first cell by the first sending end.

The first sending end provided by this embodiment of the present invention may be specifically configured to execute the foregoing method embodiment provided by FIG. 7, and specific functions are not described again herein.

In this embodiment of the present invention, a first timestamp compensation time is added to a first timestamp carried in a first cell, so that a receiving end forwards the first cell according to the first timestamp that is added with the first timestamp compensation time, to prevent a second cell, which is sent by a second sending end, from waiting at the receiving end for a cell that is sent by a first sending end at a time the same as a sending time of the second cell, where the cell reaches the receiving end after a longer delay time than a delay time after which the second cell reaches the receiving end, which improves cell forwarding efficiency of the receiving end and prevents the occurrence of cell accumulation in a link connected to the receiving end; and a delay time, which is from a sending end to a receiving end, of a cell is specifically limited, which improves calculation accuracy.

Figure 12:
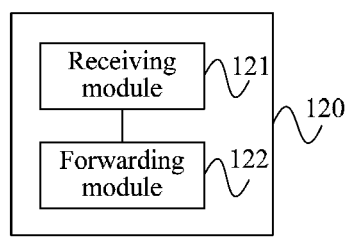
FIG. 12 is a structural diagram of a receiving end according to another embodiment of the present invention.

FIG. 12 is a structural diagram of a receiving end according to another embodiment of the present invention. The receiving end provided by this embodiment of the present invention may execute a processing procedure provided by an embodiment of a cell processing method. As shown in FIG. 12, a receiving end 120 includes a receiving module 121 and a forwarding module 122, where the receiving module 121 is configured to receive a first cell that is added with a first timestamp compensation time and sent by a first sending end, where the first timestamp compensation time is a delay time, which is added by the first sending end to a first timestamp carried in the first cell and is from the first sending end to the receiving end, of the first cell, and the first timestamp is a sending time of the first cell; and the forwarding module 122 is configured to forward the first cell according to the first timestamp that is added with the first timestamp compensation time.

Based on this embodiment of the present invention, the receiving module 121 is further configured to receive a second cell that carries a second timestamp and is sent by a second sending end, where the second timestamp includes a second timestamp compensation time and a sending time of the second cell, and the second timestamp compensation time is a delay time, which is from the second sending end to the receiving end, of the second cell.

The forwarding module 122 is specifically configured to forward the first cell according to the first timestamp that is added with the first timestamp compensation time and carried in the first cell and the second timestamp carried in the second cell.

The delay time, which is from the first sending end to the receiving end, of the first cell sent by the first sending end includes a delay of transmitting the first cell on a link between the first sending end and the receiving end, and a delay of processing the first cell by the first sending end.

The receiving end provided by this embodiment of the present invention may be specifically configured to execute the foregoing method embodiment provided by FIG. 8, and specific functions are not described again herein.

In this embodiment of the present invention, a first timestamp compensation time is added to a first timestamp carried in a first cell, so that a receiving end forwards the first cell according to the first timestamp that is added with the first timestamp compensation time, to prevent a second cell, which is sent by a second sending end, from waiting at the receiving end for a cell that is sent by a first sending end at a time the same as a sending time of the second cell, where the cell reaches the receiving end after a longer delay time than a delay time after which the second cell reaches the receiving end, which improves cell forwarding efficiency of the receiving end and prevents the occurrence of cell accumulation in a link connected to the receiving end; and a delay time, which is from a sending end to the receiving end, of a cell is specifically limited, which improves calculation accuracy.

Figure 13:
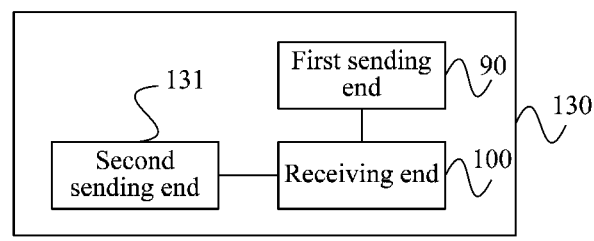
FIG. 13 is a structural diagram of a cell processing system according to another embodiment of the present invention.

FIG. 13 is a structural diagram of a cell processing system according to another embodiment of the present invention. The cell processing system provided by this embodiment of the present invention may execute a processing procedure provided by an embodiment of a cell processing method. As shown in FIG. 13, a cell processing system 130 includes a first sending end 90, a receiving end 100, and a second sending end 131.

The second sending end 131 and the first sending end 90 are sending ends that have a same function; for specific structures of the second sending end 131 and the first sending end 90, reference may be made to a structure of the first sending end 90 described in the embodiment corresponding to FIG. 9; for a specific structure of the receiving end 100, reference may be made to a structure of the receiving end 100 described in the embodiment corresponding to FIG. 10; and details are not provided again herein.

Optionally, the cell processing system 130 includes a first sending end 110, a receiving end 120, and the second sending end 131. Considering that, in this case, structures of the cell processing system 130 and the cell processing system described in FIG. 13 are similar, and therefore an accompanying drawing of a structure of the cell processing system 130 in this case is not provided.

The second sending end 131 and the first sending end 110 are sending ends that have a same function; for specific structures of the second sending end 131 and the first sending end 110, reference may be made to a structure of the first sending end 110 described in the embodiment corresponding to FIG. 11; for a specific structure of the receiving end 120, reference may be made to a structure of the receiving end 120 described in the embodiment corresponding to FIG. 12; and details are not provided again herein.

The cell processing system provided by this embodiment of the present invention may execute a processing procedure provided by an embodiment of a cell processing method.

In summary, in this embodiment of the present invention, a first timestamp compensation time is added to a first timestamp carried in a first cell, so that a receiving end forwards the first cell according to the first timestamp that is added with the first timestamp compensation time, to prevent a second cell, which is sent by a second sending end, from waiting at the receiving end for a cell that is sent by a first sending end at a time the same as a sending time of the second cell, where the cell reaches the receiving end after a longer delay time than a delay time after which the second cell reaches the receiving end, which improves cell forwarding efficiency of the receiving end and prevents the occurrence of cell accumulation in a link connected to the receiving end; and a delay time, which is from a sending end to the receiving end, of a cell is specifically limited, which improves calculation accuracy.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A cell processing method, comprising:
   obtaining, by a first sending end, a first timestamp compensation time, wherein the first timestamp compensation time is T1−Tmin, wherein T1 is a delay time, which is from the first sending end to a receiving end, of a first cell sent by the first sending end, Tmin is a minimum value of a delay time, which is from each sending end in multiple sending ends to the receiving end, of a cell sent by a respective sending end, and the multiple sending ends comprise the first sending end;
   adding, by the first sending end, the first timestamp compensation time to a first timestamp carried in the first cell, wherein the first timestamp is a sending time of the first cell; and
   sending, by the first sending end to the receiving end, the first cell that is added with the first timestamp compensation time, so that the receiving end forwards the first cell according to the first timestamp that is added with the first timestamp compensation time.

2. The method according to claim 1, wherein the obtaining, by the first sending end, the first timestamp compensation time comprises:
   obtaining, by the first sending end according to a foreknown length of a link between each sending end in the multiple sending ends and the receiving end, the delay time, which is from each sending end in the multiple sending ends to the receiving end, of the cell sent by the respective sending end, and obtaining the first timestamp compensation time.

3. The method according to claim 1, wherein the delay time, which is from each sending end in the multiple sending ends to the receiving end, of the cell sent by the respective sending end comprises a delay of transmitting the cell on the link between the respective sending end and the receiving end, and a delay of processing the cell by the respective sending end.

4. A cell processing method, comprising:
   receiving, by a receiving end, a first cell that is added with a first timestamp compensation time and sent by a first sending end, wherein the first timestamp compensation time is T1−Tmin added by the first sending end to a first timestamp carried in the first cell, wherein the first timestamp is a sending time of the first cell, T1 is a delay time, which is from the first sending end to the receiving end, of the first cell sent by the first sending end, Tmin is a minimum value of a delay time, which is from each sending end in multiple sending ends to the receiving end, of a cell sent by a respective sending end, and the multiple sending ends comprise the first sending end; and
   forwarding, by the receiving end, the first cell according to the first timestamp that is added with the first timestamp compensation time.

5. The method according to claim 4, further comprising:
   receiving, by the receiving end, a second cell that carries a second timestamp and is sent by a second sending end, wherein the second timestamp comprises a second timestamp compensation time and a sending time of the second cell, the second timestamp compensation time is T2−Tmin, and T2 is a delay time, which is from the second sending end to the receiving end, of the second cell.

6. The method according to claim 5, wherein the forwarding, by the receiving end, the first cell according to the first timestamp that is added with the first timestamp compensation time comprises:
   forwarding, by the receiving end, the first cell according to the first timestamp that is added with the first timestamp compensation time and carried in the first cell and the second timestamp carried in the second cell.

7. The method according to claim 4, wherein the delay time, which is from each sending end in the multiple sending ends to the receiving end, of the cell sent by the respective sending end comprises a delay of transmitting the cell on a link between the respective sending end and the receiving end, and a delay of processing the cell by the respective sending end.

8. A first sending end, comprising:
- an obtaining module, configured to obtain a first timestamp compensation time, wherein the first timestamp compensation time is T1−Tmin, wherein T1 is a delay time, which is from the first sending end to a receiving end, of a first cell sent by the first sending end, Tmin is a minimum value of a delay time, which is from each sending end in multiple sending ends to the receiving end, of a cell sent by a respective sending end, and the multiple sending ends comprise the first sending end;
- an adding module, configured to add the first timestamp compensation time to a first timestamp carried in the first cell, wherein the first timestamp is a sending time of the first cell; and
- a sending module, configured to send, to the receiving end, the first cell that is added with the first timestamp compensation time, so that the receiving end forwards the first cell according to the first timestamp that is added with the first timestamp compensation time.

9. The first sending end according to claim 8, wherein the obtaining module is configured to obtain, according to a foreknown length of a link between each sending end in the multiple sending ends and the receiving end, the delay time, which is from each sending end in the multiple sending ends to the receiving end, of the cell sent by the respective sending end, and obtain the first timestamp compensation time.

10. The first sending end according to claim 8, wherein the delay time, which is from each sending end in the multiple sending ends to the receiving end, of the cell sent by the respective sending end comprises a delay of transmitting the cell on the link between the respective sending end and the receiving end, and a delay of processing the cell by the respective sending end.

11. A receiving end, comprising:
- a receiving module, configured to receive a first cell that is added with a first timestamp compensation time and sent by a first sending end, wherein the first timestamp compensation time is T1−Tmin added by the first sending end to a first timestamp carried in the first cell, wherein the first timestamp is a sending time of the first cell, T1 is a delay time, which is from the first sending end to the receiving end, of the first cell sent by the first sending end, Tmin is a minimum value of a delay time, which is from each sending end in multiple sending ends to the receiving end, of a cell sent by a respective sending end, and the multiple sending ends comprise the first sending end; and
- a forwarding module, configured to forward the first cell according to the first timestamp that is added with the first timestamp compensation time.

12. The receiving end according to claim 11, wherein the receiving module is further configured to receive a second cell that carries a second timestamp and is sent by a second sending end, wherein the second timestamp comprises a second timestamp compensation time and a sending time of the second cell, the second timestamp compensation time is T2−Tmin, and T2 is a delay time, which is from the second sending end to the receiving end, of the second cell.

13. The receiving end according to claim 12, wherein the forwarding module is configured to forward the first cell according to the first timestamp that is added with the first timestamp compensation time and carried in the first cell and the second timestamp carried in the second cell.

14. The receiving end according to claim 11, wherein the delay time, which is from each sending end in the multiple sending ends to the receiving end, of the cell sent by the respective sending end comprises a delay of transmitting the cell on a link between the respective sending end and the receiving end, and a delay of processing the cell by the respective sending end.

* * * * *